Figure 1:
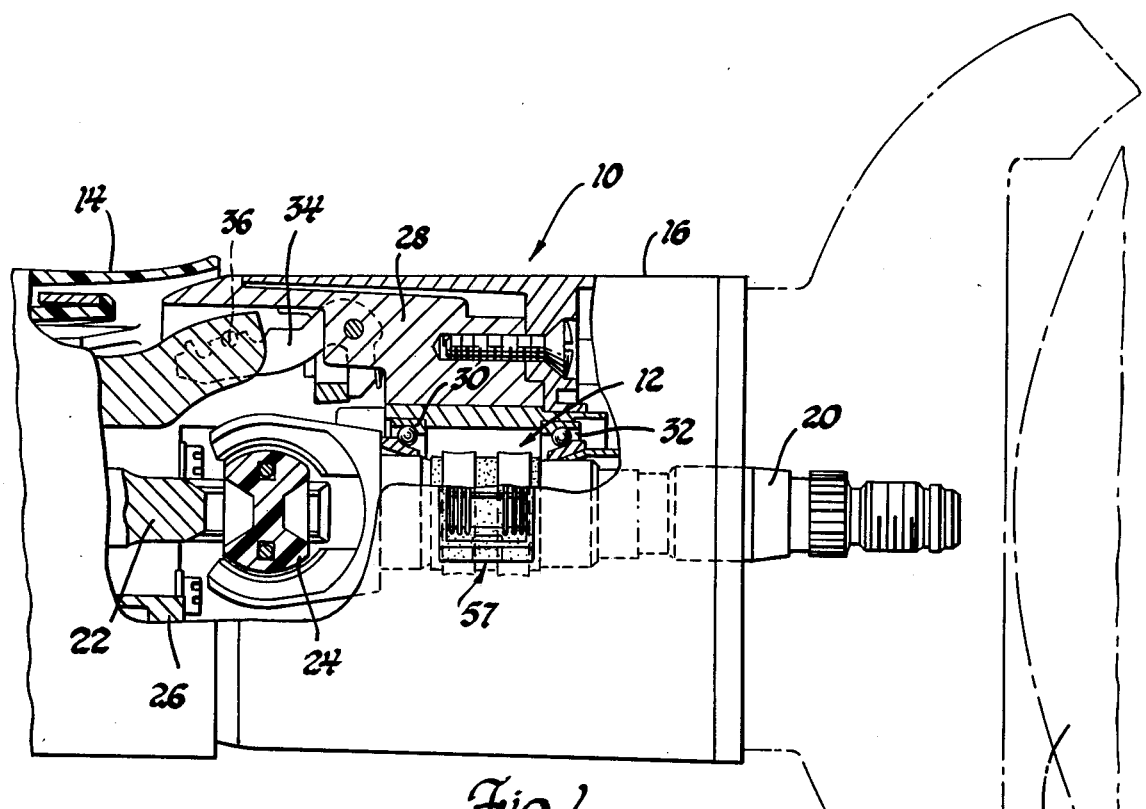

United States Patent [19]

Cymbal et al.

[11] 4,223,911
[45] Sep. 23, 1980

[54] ELECTRICAL CONNECTOR ARRANGEMENT FOR MOTOR VEHICLE STEERING ASSEMBLY

[75] Inventors: William D. Cymbal, Freeland; William R. Knuth, Saginaw, both of Mich.

[73] Assignee: General Motors Corporation, Detroit, Mich.

[21] Appl. No.: 883,697

[22] Filed: Mar. 6, 1978

[51] Int. Cl.² .............................................. B60R 21/02
[52] U.S. Cl. .................................. 280/731; 339/3 S; 339/5 M
[58] Field of Search ...................... 280/731, 734, 735; 339/3 S, 3 R, 5 M, 5 R, 8 R

[56] References Cited

U.S. PATENT DOCUMENTS

| | | | |
|---|---|---|---|
| 1,480,656 | 1/1924 | Blackburn | 339/3 S |
| 2,069,129 | 1/1937 | Braun | 339/3 S X |
| 2,924,800 | 2/1960 | Scarborough | 339/5 M |
| 3,336,559 | 8/1967 | Laubi | 339/8 R |
| 3,525,536 | 8/1970 | Pruneski | 280/731 |
| 3,719,916 | 3/1973 | Worner et al. | 339/3 R |
| 3,876,272 | 4/1975 | Tsutsumi et al. | 280/731 X |
| 3,905,664 | 9/1975 | Baldoni | 339/8 R |
| 4,029,168 | 6/1977 | Kramer et al. | 70/252 X |
| 4,063,789 | 12/1977 | Kreisl | 339/3 S |

Primary Examiner—John J. Love
Assistant Examiner—Milton L. Smith
Attorney, Agent, or Firm—Edward J. Biskup

[57] ABSTRACT

An electrical connector arrangement for a motor vehicle steering assembly that includes a steering shaft having an insulator sleeve mounted thereon. A pair of conductor rings are supported by the insulator sleeve and are adapted to be electrically connected to an occupant restraint cushion and to rotate with the steering shaft. Each of the conductor rings is formed with an annular track in the periphery thereof and both conductor rings cooperate with a pair of contact members fixed to the steering column member so as to provide current to the conductor rings upon operation of a sensor for actuating an occupant restraint cushion.

2 Claims, 6 Drawing Figures

U.S. Patent  Sep. 23, 1980  Sheet 1 of 2  4,223,911

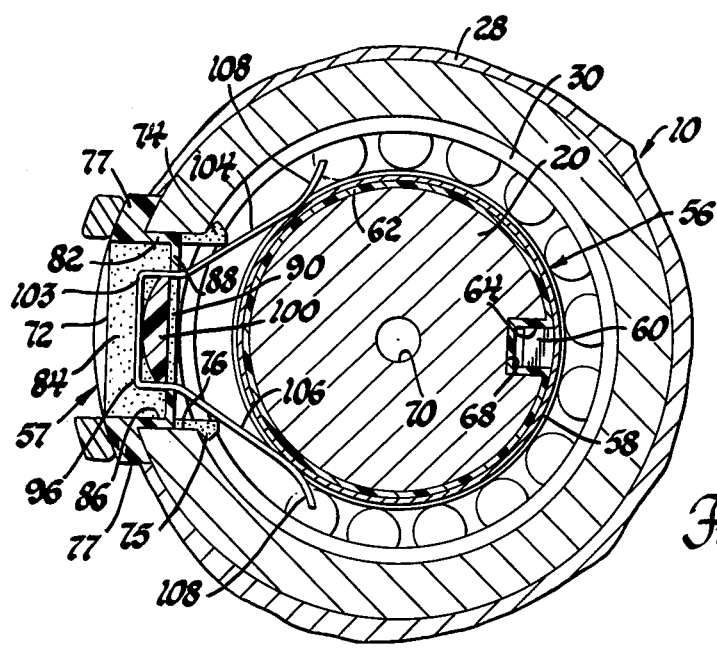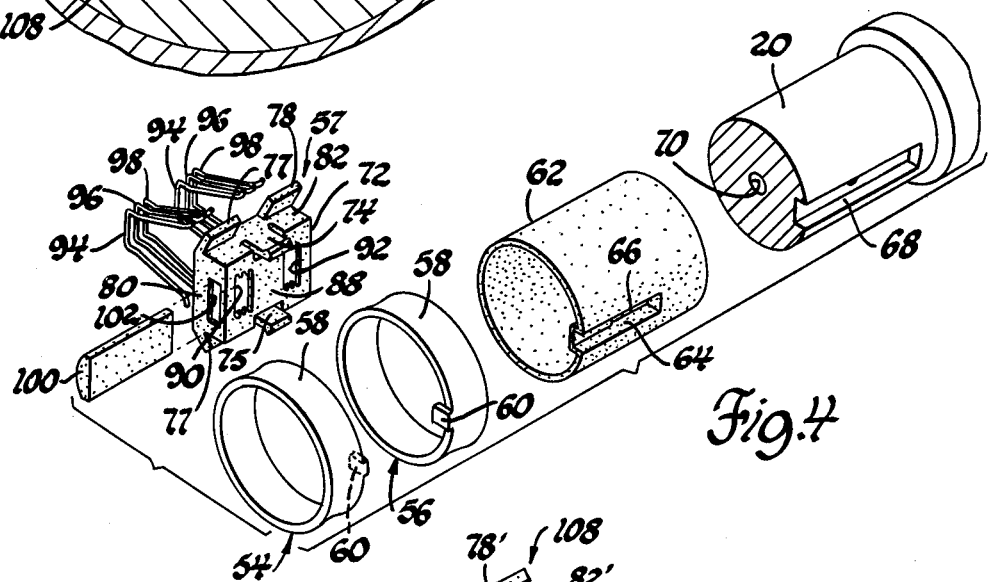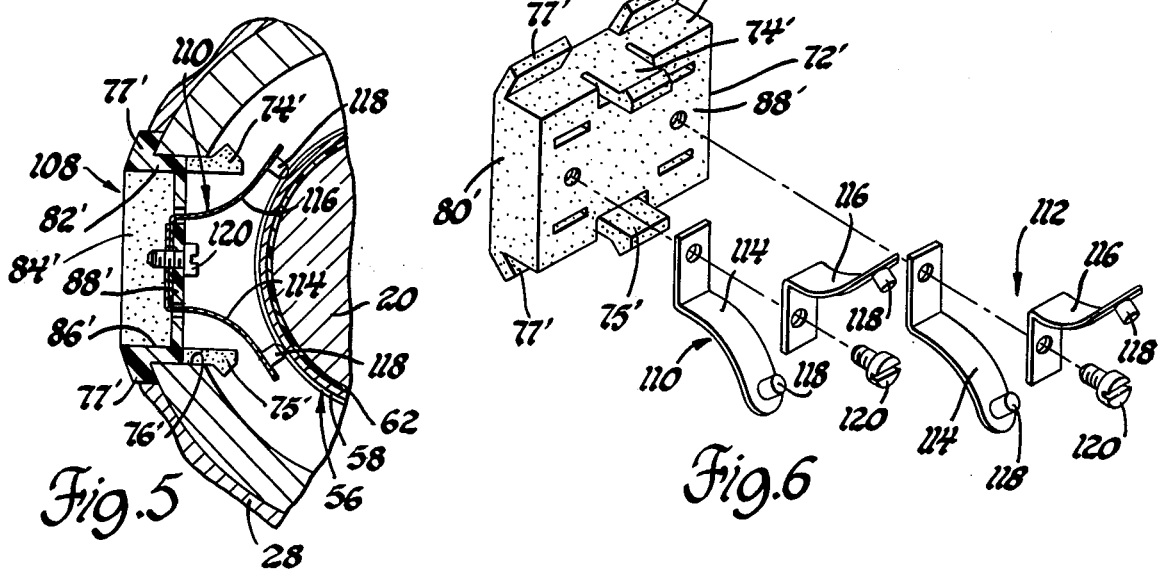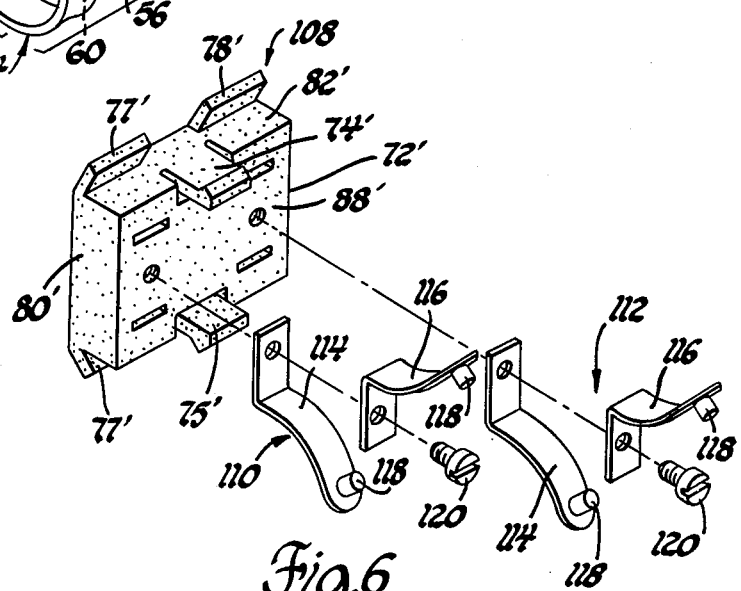

ELECTRICAL CONNECTOR ARRANGEMENT FOR MOTOR VEHICLE STEERING ASSEMBLY

This invention concerns a steering wheel occupant restraint cushion system, in general, and more particularly relates to an electrical connector arrangement for such system that is interposed between the steering column and the steering shaft for allowing relative movement therebetween while continuously providing electrical continuity between a sensor and an occupant restraint cushion mounted in the steering wheel.

More specifically, the electrical connector arrangement according to the invention is combined with a motor vehicle steering assembly which includes a steering column member that rotatably supports a steering shaft which, in turn, is fixed to a steering wheel having an occupant restraint cushion mounted therein. The vehicle is provided with a sensor for actuating the occupant restraint cushion and an electrical connector arrangement is interposed between the steering column and the steering shaft for allowing relative movement therebetween while continuously providing electrical continuity between the sensor and the occupant restraint cushion. The electrical connector arrangement is characterized in that it includes an insulator sleeve that is carried by the steering shaft and has mounted thereon a pair of conductor rings which are adapted to be electrically connected to the occupant restraint cushion and also are adapted to rotate with the steering shaft. Each of the conductor rings has an annular track formed in the periphery thereof and is located in a plane that is substantially perpendicular to the longitudinal center axis of the steering shaft. A pair of flexible contact members are fixed to the steering column member for continuously maintaining engagement with the tracks in the conductor rings and serve to provide current to the conductor rings upon operation of the sensor.

The objects of the present invention are to provide a new and improved electrical connector assembly for a motor vehicle steering wheel occupant restraint cushion that uses a pair of spaced conductor rings that are fixed to the shaft portion of the steering wheel and cooperate with a pair of flexible contact members connected to the stationary steering column for providing electrical continuity between a sensor and a gas generator which forms a part of the occupant restraint cushion; to provide a new and improved contact arrangement for maintaining electrical continuity between relatively rotatable members that includes a pair of conductor rings and a pair of spring-like wire members wherein the conductor rings have annular tracks formed in the periphery thereof that are curved when viewed in cross section and serve as guide means for the contact members; and to provide a new and improved electrical connection between relatively rotatable members wherein one of the members is a steering wheel shaft that supports a pair of spaced conductor rings mounted on an insulator sleeve and the other member is a stationary steering column that has wire-like contact members fixed thereto and adapted to ride within tracks formed in the periphery of the conductor rings.

Figure 2:
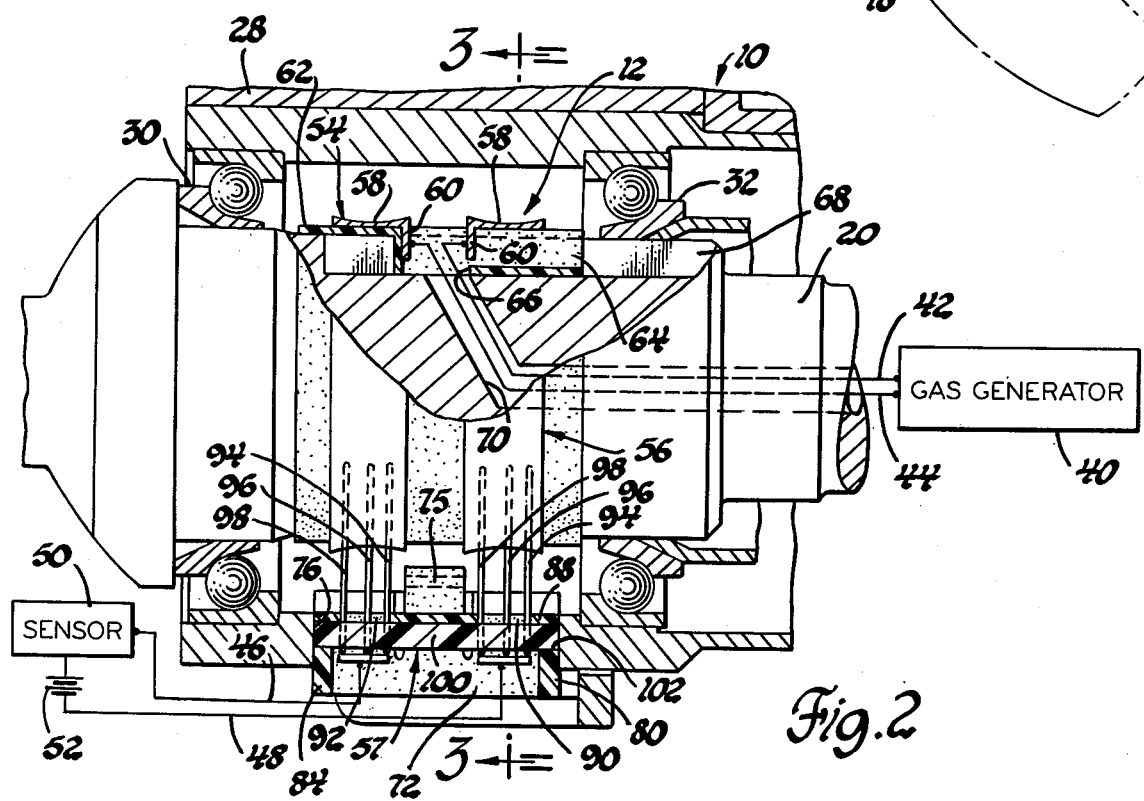

Other objects and advantages of the invention will be more apparent from the following detailed description when taken with the drawings in which:

FIG. 1 is an elevational view showing a steering wheel assembly incorporating an electrical connector arrangement made according to the invention, FIG. 2 is an enlarged view showing the electrical connector arrangement incorporated in the steering wheel assembly of FIG. 1, FIG. 3 is a sectional view taken on line 3—3 of FIG. 2, FIG. 4 is an exploded view showing the various parts of the electrical connector arrangement disclosed in the above-mentioned Figures, FIG. 5 is a modified form of the flexible contact members incorporated in the invention as disclosed in Figures 1-4, and FIG. 6 is an exploded view showing the various parts of the contact member assembly disclosed in FIG. 5.

Referring to the drawings and more particularly FIG. 1 thereof, a steering column assembly 10 is shown that includes an electrical connector arrangement 12 made in accordance with the invention. The steering column assembly 10 is provided with a fixed lower steering column member 14 that incorporates an angularly tiltable upper steering column member or head 16 having a steering wheel 18 mounted thereon. The tiltable head 16 and the connected steering wheel 18 are adjustable as a unit to predetermined angular positions to facilitate vehicle entry and exit by the driver and to maximize driver comfort by permitting the driver to place the steering wheel at a convenient angle when driving the vehicle.

The steering wheel 18 is fixedly connected to an upper steering shaft 20 of a steering shaft assembly that extends axially within the steering column member 14. In addition to the upper steering shaft 20, the steering shaft assembly includes a lower steering shaft 22 connected to the upper steering shaft by a universal joint 24 which permits the upper steering shaft 20 to be angularly adjusted with respect to the lower steering shaft 22. The lower steering shaft 22 is connected to the steering gear, not shown, in a conventional manner so that the steering wheel 18 can be turned and thereby turn the dirigible wheels of the vehicle. The upper end of the lower steering shaft 22 projects axially through a generally cylindrical support assembly 26 which is secured by screws to a retainer, not shown, connected to the upper jacket of the steering column member 14. The upper steering shaft 20 is rotatably mounted within a cylindrical bearing housing 28 and is rotatably supported therein by anti-friction bearings 30 and 32. The bearing housing 28 is connected to the support assembly 26 by pivot pins, not shown, so as to permit limited pivotal movement of the upper steering shaft 20. The bearing housing 28 supports a pair of locking shoes one of which only is shown in FIG. 1 and is identified by reference numeral 34. Each locking shoe has longitudinally spaced teeth for selective engagement with a lock shoe pin 36 secured in the support assembly.

A steering column assembly of the type described above is shown in U.S. Pat. No. 4,029,168 which issued on June 14, 1977 in the name of Richard L. Kramer and is assigned to the asignee of this invention. Reference is made to the latter mentioned patent for a more complete detailed description of the steering column assembly.

In this case, the steering wheel 18 incorporates an occupant restraint cushion schematically shown in FIG. 1 and identified by the reference numeral 38. As seen in FIG. 2, the restraint cushion 38 incorporates a gas generator 40 that is connected by a pair of conductors 42 and 44 to the electrical connector arrangement 12. In addition, it will be noted that the electrical connector arrangement 12 is connected by conductors 46 and 48 to a sensor 50 which can be positioned at the front end of a vehicle for sensing sudden deceleration such as would occur due to impact of the vehicle with an obstacle. At such time, the sensor 50 is actuated and causes a circuit to be completed to a battery 52 for energizing the gas generator 40 through the electrical connector arrangement 12.

The electrical connector arrangement 12 includes a pair of identical conductor rings 54 and 56 and a contact assembly 57. As seen in FIGS. 2, 3 and 4, the conductor rings 54 and 56 are cylindrical in configuration with the periphery of each having a track 58 that is arcuately shaped when viewed in cross section. The arcuate shape of the track 58 is uniform about the entire circumference of each conductor ring, and each of the rings 54 and 56 is provided with a radially extending square tab 60. The rings 54 and 56 are mounted on the cylindrical insulator sleeve 62 which is formed with a groove portion 64 having an aperture 66 therein. The tab 60 of each conductor ring extends into the groove portion 64 which is generally square in cross section as seen in FIG. 3. The conductor rings 54 and 56 are axially spaced from each other with the tabs 60 located adjacent the opposed sides of the aperture 66 as seen in FIG. 2.

The insulator sleeve 62 is non-rotatably supported on the upper steering shaft 20 by having the groove portion 64 of the sleeve 62 maintained within a correspondingly shaped longitudinal slot 68 formed in the steering shaft 20. The sleeve 62 is made from a plastic material and has the inner cylindrical surface dimensioned so as to provide a non-slip fit with the outer cylindrical surface of the steering shaft 20.

As seen in FIG. 2, the aperture 66 in the groove portion 64 registers with one end of an "L" shaped passage 70 formed in the steering shaft 20. The conductors 42 and 44 extend through the passage 70 and are connected at one end to the tabs 60 associated with the conductor rings 54 and 56 and are connected at the other end to the gas generator 40 incorporated in the occupant restraint cushion system 38. Thus, from the above-description, it should be apparent that upon rotation of the steering wheel 18 corresponding rotation of the upper steering shaft 20 occurs which, in turn, causes rotation of the conductor rings 54 and 56 mounted thereon.

The contact assembly 57 is fixedly mounted in the bearing housing 28 and consists of a plug-in type support member 72 made of an insulating material such as plastic and having a pair of outwardly projecting flexible tab members 74 and 75 which are adapted to flex inwardly towards each other when they are passed through a rectangular opening 76 formed in the bearing housing. Afterwards, the tab members 74 and 75 flex outwardly and serve as retaining means together with associated laterally extending arms 77 and 78 for holding the support member 72 in fixed relationship with the bearing housing 28.

The support 72 has a hollow interior that is defined by side walls 80, 82, 84, 86 and a base wall 88. The base wall 88 has a pair of spaced rectangular apertures 90 and 92 formed therein with a plurality of teeth provided at opposed sides of each of the apertures. Each aperture 90, 92 receives three identical wire-like contact members 94, 96, 98 which are retained within the accommodating aperture by a key 100 that passes through an opening 102 formed in each of the side walls 80 and 84 and maintains the contact members in fixed relationship with the support member 72.

As best seen in FIG. 3, each of the contact members 94, 96, 98 is generally V-shaped in configuration with the apex portion 103 being U-shaped and integrally formed with outwardly diverging straight leg sections 104 and 106 each of which terminates in a curved section 108. As seen in FIG. 2, each group of three contact members 94, 96, 98 is electrically connected to one of the conductors 46 and 48 that lead to the sensor 50. Also, the curved section 108 of each of the contact members 94, 96, 98 engages the outer periphery of the associated conductor rings and rides within the curved track 58 formed therein. In this manner, the curved configuration of each conductor ring 54 and 56 serves as guide means for maintaining the curved outer section 108 of each of the contact members in engagement with the associated conductor rings.

FIGS. 5 and 6 show a modified contact assembly 108 with the parts thereof that correspond to the parts incorporated in the contact assembly 57 being identified by the same numerals but primed. As best seen in FIG. 6, the contact assembly 108 includes a pair of contact members 110 and 112 which are similar to the contact members incorporated in the contact assembly 57 shown in FIGS. 1-4, except that each contact member 110, 112 consists of a pair of flexible blades 114 and 116 each of which has a contact button 118 fixedly connected to the outer curved ends thereof. The blades 114 and 116, in each case, are identical parts that are apertured at one end so as to receive a threaded fastener 120 for connecting the contact member to the base wall 88' of the support member 72'. As in the case with the contact assembly 57 shown in FIGS. 1-4, a suitable conductor would be connected to each of the contact members 110 and 112 for electrical connection with the sensor 50. The contact buttons 118 connected to the blades 114 and 116 are adapted to ride within the track 58 formed in the peripheral portion of the associated conductor ring. Also, the tab members 74' and 75' cooperate with the laterally projecting arms 77' and 78' integrally formed with each side wall 82' and 86' for retaining the contact assembly 108 in the rectangular opening 76' formed in the bearing housing. 28.

It should be apparent from the above description that the electrical connector arrangements described above provide electrical continuity between the sensor 50 and the gas generator of the occupant restraint cushion 38 during all positions of the steering wheel 18. Accordingly, the steering wheel 18 can be rotated for turning the wheels of the vehicle and still maintain an electrical connection between the sensor 50 and the restraint cushion 38 so that upon operation of the sensor, the gas generator 40 can be activated for deploying the cushion within the steering wheel 18.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a motor vehicle steering assembly including a steering column member rotatably supporting a steering shaft fixed to a steering wheel having an occupant restraint cushion, said vehicle having a sensor for actuating said occupant restraint cushion, an electrical connector arrangement interposed between said steering column and said steering shaft for allowing relative movement therebetween while continuously providing electrical continuity between said sensor and said occupant restraint cushion, said electrical connector arrangement comprising a cylindrical insulator sleeve having a groove portion for location in a slot formed in said steering shaft, a pair of conductor rings mounted on said insulator sleeve, a tab integrally formed with each of said conductor rings and positioned within said groove portion, said tab of each conductor ring adapted to be electrically connected to said occupant restraint cushion, each of said conductor rings having a curved track formed in the periphery thereof and being located in a plane that is substantially perpendicular to the longitudinal center axis of the steering shaft, and a pair of flexible contact members fixed to said steering column member for continuously maintaining engagement with the track in each of the conductor rings and adapted to provide current to said conductor rings upon operation of said sensor.

2. In combination with a motor vehicle steering assembly including a steering column member rotatably supporting a steering shaft fixed to a steering wheel having a occupant restraint cushion, said vehicle having a sensor for actuating said occupant restraint cushion, an electrical connector arrangement interposed between said steering column and said steering shaft for allowing relative movement therebetween while continuously providing electrical continuity between said sensor and said occupant restraint cushion, said electrical connector arrangement comprising an insulator sleeve carried by said steering shaft, a pair of conductor rings mounted on said insulator sleeve and adapted to be electrically connected to said occupant restraint cushion and to rotate with said steering shaft, each of said conductor rings having a curved track formed in the periphery thereof and being located in a plane that is substantially perpendicular to the longitudinal center axis of the steering shaft, a pair of flexible contact members fixed to said steering column member for continuously maintaining engagement with the track in each of the conductor rings and adapted to provide current to said conductor rings upon operation of said sensor, each of said contact members being V-shaped and having diverging legs terminating curved sections which engage the outer periphery of the associated conductor ring and ride within the curved track formed therein, a plug-in type member mounted in said steering column, and a key member cooperating with said plug-in type member for supporting said contact members adjacent to said conductor rings.

* * * * *